July 5, 1949. L. W. PREMO 2,475,049
TOOL BLOCK FOR LATHES AND THE LIKE
Filed Sept. 16, 1944 2 Sheets-Sheet 1
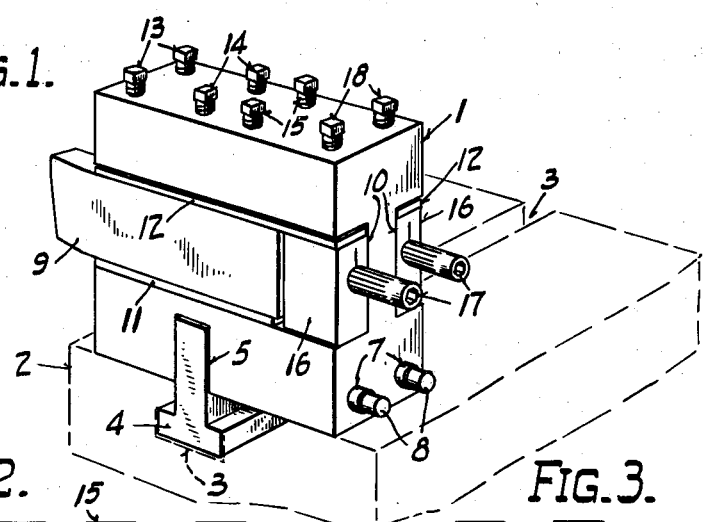
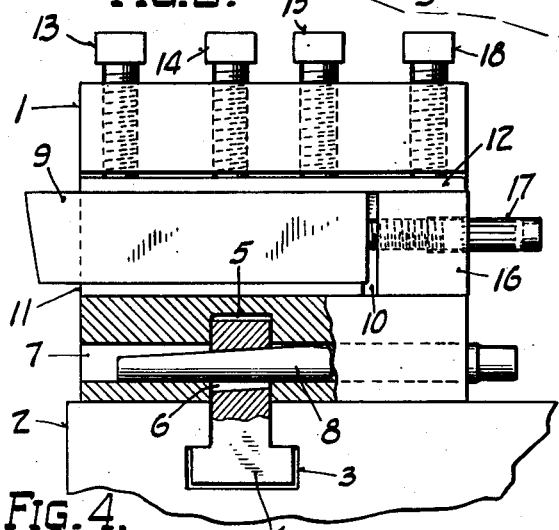
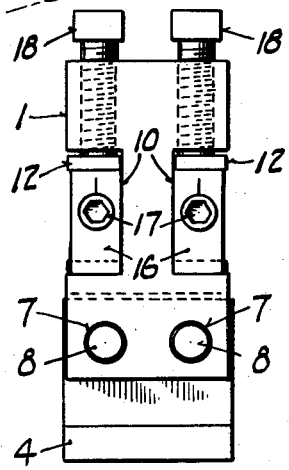
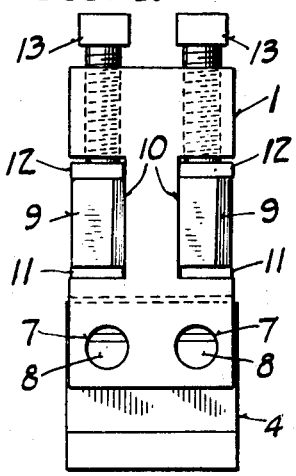
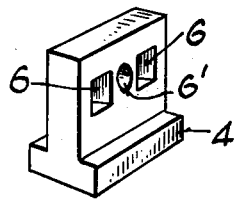
Lewis W. Premo
INVENTOR.
BY
ATTORNEY.

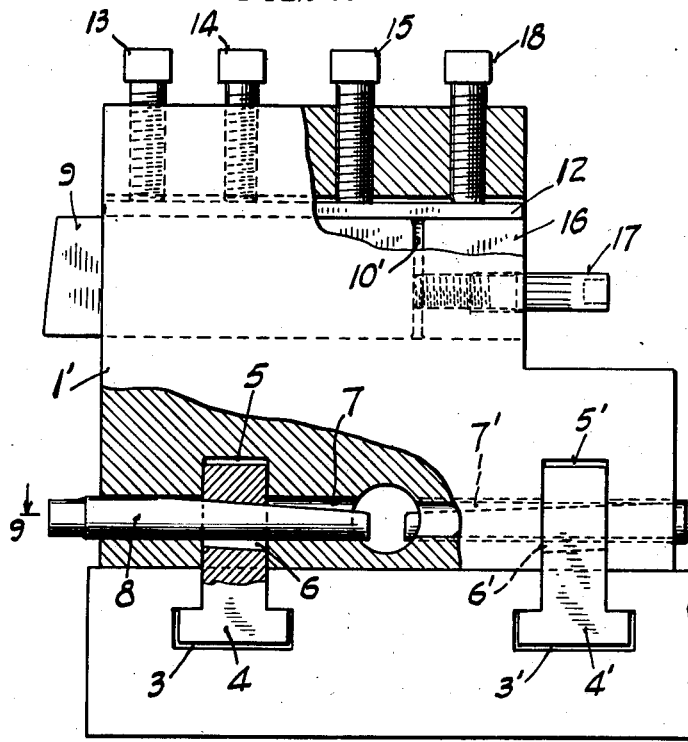

Patented July 5, 1949

2,475,049

UNITED STATES PATENT OFFICE 2,475,049

TOOL BLOCK FOR LATHES AND THE LIKE

Lewis W. Premo, Madison, Wis., assignor to Gisholt Machine Company, Madison, Wis., a corporation of Wisconsin Application September 16, 1944, Serial No. 554,352

6 Claims. (Cl. 82—36)

This invention relates to a tool block for lathes and the like.

The invention has for its principal object the providing of a tool block that more firmly secures the tool in its position against cutting pressures and substantially eliminates inaccuracies arising from the stretch or give of the metal of the parts clamping the block to the base.

Another object of the invention is to provide a tool block which can be made smaller in width, and thereby allow the setting of more tools adjacent to one another.

Another object is to provide a less costly and more rapidly applied means for securing a tool block to its supporting base.

A further object is to provide a simple and easier method of shimming the shank of the tool and protecting the same from the inner ends of the clamping screws.

Other objects will appear hereinafter in connection with the description of an embodiment of the invention illustrated in the accompanying drawings.

In the drawing:

Figure 1 is a perspective view of a tool block assembled and shown secured to a base which is dotted in place;

Fig. 2 is a side elevation of the tool block with parts in section to show the construction, and with a tool clamped therein;

Fig. 3 is a rear end elevation of Fig. 2;

Fig. 4 is a forward end elevation of Fig. 2;

Fig. 5 is a perspective view of the T clamp member;

Fig. 6 is a perspective view of a tapered clamping pin;

Fig. 7 is a side elevation showing the application of the invention to a rear cutting block employing two T clamping members with parts broken away and sectioned;

Fig. 8 is a rear end elevation of Fig. 7; and

Fig. 9 is a transverse horizontal section taken on line 9—9 of Fig. 7 and showing the holes for knocking out the wedge pins.

The tool block 1 is of rectangular shape, generally longer than it is wide, and it is adapted to rest on a base 2 with the end of the block facing the obejct to be cut or machined.

The base 2 has a standard T-slot 3 facing upwardly for clamping the tool block in place, the slot 3 extending parallel to the end face of the tool block.

The block 1 is clamped to the base 2 by an inverted T-member 4 having its head fitting in the T-slot 3 of the base and its shank extending upwardly like a transverse rib on the surface of base 2 and fitting in a transverse slot 5 in the bottom of block 1. The T-member 4 preferably has a length approximating the width of the block 1.

The T-member 4 has a pair of broached flat top holes 6 in general alignment with longitudinal holes 7 in the bottom portion of block 1.

A wedge pin 8 which is tapered in thickness is driven into each hole 7 and through the corresponding hole 6 to complete the clamping of the block 1 to base 2.

The wedge pins 8 are shown as having a round body with the top surface for a substantial portion of its inner end flattened to provide a taper of about an angle of 3°. The holes 6 are shown as having a flat slanting upper surface corresponding to the taper on the pins 8 so that the latter bear against the slanting surface of the shank of the T-member 4 uniformly for substantially the full thickness of the block.

When the pins 8 are driven tightly in place the bottom surfaces of the pins are rigidly supported on the bottoms of holes 7 on either side of the shank of T-member 4 and the latter is forced upwardly by the wedging action of the pins, thereby pulling the head of member 4 upwardly against the top of T-slot 3 and clamping the block 1 securely down upon the base 2.

The wedge pins 8 are preferably sufficiently long to extend from the hole 7 at the rear end of block 1 when in place so that the pin can be readily driven home in clamping the block. The pin may also be sufficiently long to have its forward end extend out of the hole 7 at the front of block 1 so that when it is desired to release or remove the block 1 the pin can be driven back out of the hole with ease. However, it has been found satisfactory to employ shorter pins and to drive them out by means of a punch inserted in the end of the respective hole 7.

The hole 7 is shown to be horizontal so that the slanting surface of T-member 4 uniformly engages the corresponding surface of the pin 8. However, it is possible to slant the hole 7 and construct the hole 6 in T-member 4 horizontal. Various shapes of pins 8 and of holes 6 and 7 may be employed in obtaining the combined wedging effect for clamping the block 1 to base 2.

The slot 5 for receiving the shank of T-member 4 is offset longitudinally of the block 1 to provide for adjustment of the position of the cutting tool 9 when the block is reversed, end for end.

When the block is made longer as in rear tool blocks where the tools are usually employed for end facing it may be desirable to prevent sideways twisting of the block 1' from its position by employing a second T-member 4' in a T-slot 3' disposed parallel to the T-member 4 and slot 3, respectively, as illustrated in Figs. 7, 8 and 9.

In this construction a central hole 7' is provided through block 1' to register with a central hole 6' provided in the shank of each of the T-members 4 and 4'. The rear T-member 4' is clamped by a pin 8' inserted from the rear end of block 1' in central hole 7' and wedging in the hole 6'. The forward T-member 4 is clamped by the pins 8 inserted in holes 7 from the front end of the block. The pins 8 and 8' can be removed by the use of a punch inserted in the opposite ends of the respective holes 7 and 7' and through the respective holes in the opposite T-member.

The tool 9 usually is of standard shank dimensions having a width of about five-eighths of an inch and a thickness or height of either three-quarters of an inch, an inch or an inch and a quarter. In order to accommodate the shank of the tool 9, block 1 has a longitudinal slot 10 in its side and having a depth of five-eighths of an inch and a height of an inch and a half. The dimensions given above are illustrative only and may be varied to suit the conditions involved.

The recess or slot 10 extends longitudinally along the side of the block 1 and in the block illustrated in Figures 1 to 6 there is a similar recess on each side so that two separate tools may be held by the block, one in each recess. In the block illustrated in Figs. 7, 8 and 9 the recess 10' constitutes a central opening longitudinally through the block for receiving a tool or tools 9.

A supporting shim 11 may be provided to be placed underneath the shank of the tool 9 and in practice shims of different thicknesses will be provided to accommodate tools of different standard shank thicknesses.

A strip shim 12 is provided on top of the tool to receive the ends of the vertical clamping screws 13, 14 and 15 so that the latter do not mar or injure the surface of the tool shank.

An adjusting block 16 is fitted in the rear end of slot 10 and has a longitudinally extending horizontal micrometer adjusting screw 17 for fine adjustment of the position of the cutting edge of tool 9. A clamping screw 18 is provided downwardly through the top of block 1, similar to screws 13, 14 and 15, for clamping block 16 in place.

The shim 12 is made the same length as block 1 and extends over the top of the block 16 as well as of the shank of tool 9. In this way block 16 is protected from wear from the screw 18, and the shim 12 is held in place during removal and adjustment of the tool. There is no danger of displacement of the shim 12 when the clamping screws 13, 14 and 15 are released and micrometer screw 17 is being operated or the tool 9 removed.

The invention may have various embodiments within the scope of the accompanying claims.

I claim:

1. In combination, a tool block having means for adjustably clamping a tool thereto and a recess for receiving a clamping member, and a wedge pin adapted to be driven into the tool block and through the clamping member to bias the same in opposite directions for clamping the tool block in place, said tool block having a hole extending therethrough for receiving said wedge pin and being adapted to provide for driving of said wedge pin from said clamping member to release the tool block therefrom.

2. In combination, a tool block having a plurality of holes extending longitudinally therethrough side by side near the base thereof and a recess transversely intersecting said holes near each end of the block for receiving corresponding clamping inserts, and wedge pins adapted to be inserted from opposite ends of the block in alternate holes to pass through respective clamping inserts and clamp the block in place against vertical and horizontal displacement.

3. In combination, a tool block, a wedge pin extending therethrough for clamping the same to a support, a tool having a shank disposed in a longitudinal recess in said clock, clamping screws extending through a portion of the block into said recess for clamping the tool in position, and adjusting block disposed in said recess at the rear end of said tool and having a micrometer screw for adjusting the position of the tool, a clamping screw parallel to said first named clamping screws for securing said adjusting block in fixed position, and a shim extending beneath all of said clamping screws to protect said tool shank and adjusting block from injury and more uniformly distribute the clamping pressure thereto.

4. In combination, a tool block, a tool having a shank disposed in a longitudinal recess in said block, clamping screws extending through a portion of the block into said recess for clamping the tool in position, an adjusting block disposed in said recess at the rear end of said tool and having a micrometer screw for adjusting the position of the tool, a clamping screw parallel to said first named clamping screws for securing said adjusting block in fixed position, and a shim extending beneath all of said clamping screws to protect said tool shank and adjusting block from injury and more uniformly distribute the clamping pressure thereto.

5. In a lathe, a tool block having means for adjustably clamping a cutting tool thereto and a recess in its base for receiving a clamping member, a flat top support for said tool block having a T-slot in the top thereof for receiving a clamping member, an inverted T-shaped clamping member of substantial length having its head disposed in said slot and its central leg extending upwardly into the recess in said tool block, said tool block having a hole extending through the base thereof at an angle to said recess and clamping member and offset above a corresponding hole in the latter, and a wedge pin adapted to be driven into said hole and through said clamping member to bias the tool block downwardly upon its support on opposite sides of the recess and rigidly secure said clamping member in adjusted position in said slot, at least one of the bearing surfaces of said wedge pin being semi-circular in cross section and adapted to float in a corresponding bearing to provide for self-adjustment of the pin to the angular position of the opposite bearing surface of the pin.

6. In a tool block clamp of the class described, the improvement of avoiding distortion of the tool block by securing bolts and the like and eliminating space requirements of such bolts, by providing a wedge clamp mounting for the tool block directly beneath the tool recesses in the block, said wedge clamp comprising a circular wedge pin extending substantially horizontally in a hole in the base of the block and having a flat side and an opposite substantially semi-circular side, one side of the pin being disposed longitudinally at an angle to the other, and a clamping member extending upwardly from a support for the block into a slot in the block cutting across said hole and pin, and said wedge pin passing through said clamping member with the upper side of the bearing surface of said clamping member against said pin complemental to the corresponding side of said pin, and the lower side of the bearing surface of the hole in said block complemental to the opposite side of said pin whereby the wedge clamp is self-adjusting to tolerances of the several parts and effectively secures the block in place by a distributed clamping pressure in the base of the block without distortion of the tool holders of the block

LEWIS W. PREMO.

REFERENCES CITED

The following references are of record in the file of this patent:

UNITED STATES PATENTS

| Number | Name | Date |
| --- | --- | --- |
| 422,874 | Benton | Mar. 4, 1890 |
| 885,949 | Peirce | Apr. 28, 1908 |
| 920,998 | Reiss | May 11, 1909 |
| 1,268,969 | Harding | June 11, 1918 |
| 1,626,953 | Muller | May 3, 1927 |